Oct. 30, 1962     G. J. ARQUETTE ET AL     3,061,458
INSOLUBILIZATION OF COATINGS
Filed Dec. 20, 1960
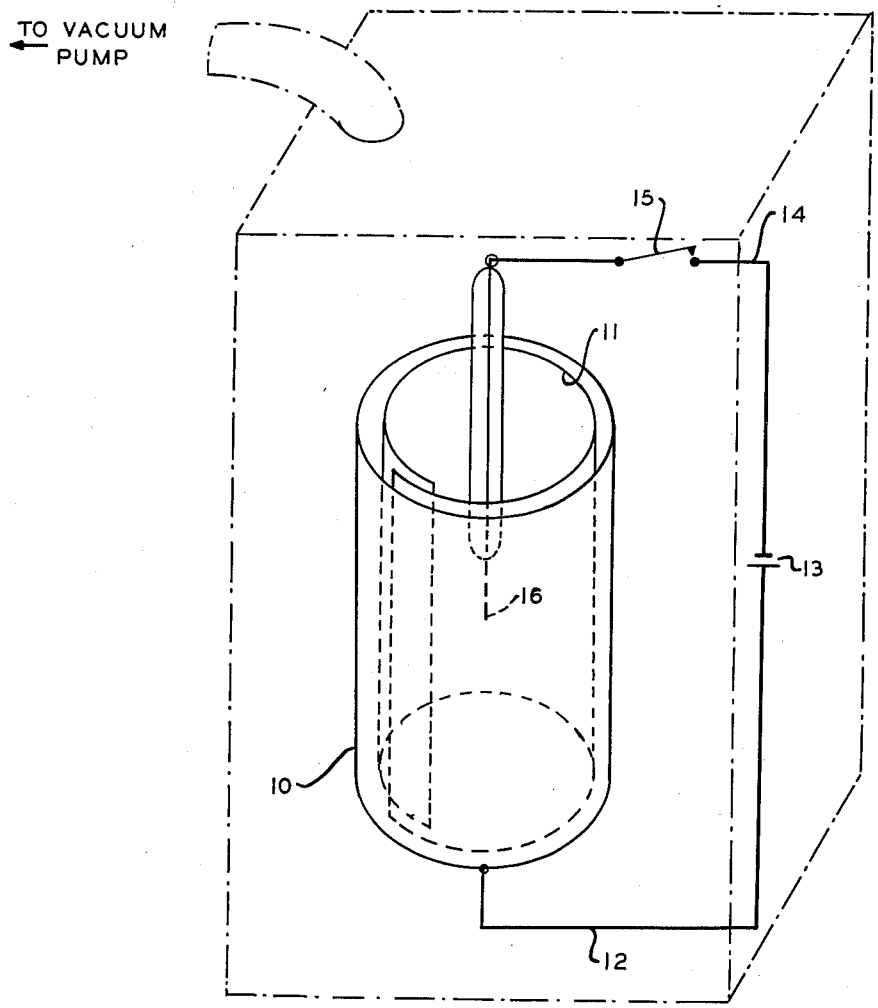
INVENTORS
GORDON J. ARQUETTE
LEO REICH
BY
ATTORNEY 3,061,458
INSOLUBILIZATION OF COATINGS
Gordon J. Arquette, New Providence, and Leo Reich, Newark, N.J., assignors to Air Reduction Company, Incorporated, New York, N.Y., a corporation of New York
Filed Dec. 20, 1960, Ser. No. 77,170
6 Claims. (Cl. 117—62)

This invention relates to a process for water insolubilizing coating compositions. It more particularly relates to a process for improving the water resistance of paper and like products which have been coated or sized with coating compositions that include adhesive and/or film forming ingredients such as polyvinyl alcohol or casein.

In the manufacture of high quality papers and paperboards, coating compositions containing adhesives such as polyvinyl alcohol and/or casein are utilized in order to impart to these papers exceptional color brightness, opacity, tone and wet strength. In general, the water solubility of the adhesive limits the usefulness of the coating composition, and therefore the product so coated. The water solubility of paper coatings and the low water resistance of papers resulting from the prior art processes utilizing these coatings, precluded their use in many desirable areas, particularly in the coating of papers with pigmented compositions. In other coating arts, such as in coated fabrics, the solubility of coating and film forming compositions, such as polyvinyl alcohol and casein has also served to restrict the usefulness of the finished product.

Heretofore, chemical means have been employed to diminish water solubility of binder compositions of this type and increase the water resistance of the coated papers; however, the products of these prior art processes possessed several undesirable characteristics. Usually the addition of significant amounts of insolubilizing agent deleteriously affects the tone and color of the paper. Frequently, the water resistance of chemically treated papers would decrease on standing because of some uncontrollable chemical reaction. Even when shelf stability and proper color characteristics had been achieved, the papers were not water resistant to the extent demanded by the trade.

It is an object of this invention, therefore, to provide a process for rendering coating compositions insoluble in water.

It is a further object of this invention to provide a process for rendering papers coated with compositions containing adhesives such as polyvinyl alcohol and/or casein, substantially water resistant.

It is still a further object of this invention to provide a process, utilizing electrical means which will provide papers and paperboards superior to those of the prior art, in water resistance characteristics.

In general, these objects are accomplished by exposing products which are coated with coating compositions containing polyvinyl alcohol and/or casein to a low energy electrical discharge.

These objects may also be accomplished by a variation or modification of this invention wherein a combination of chemical and low energy electrical means are employed. In this embodiment the papers and/or paperboards are coated with coating compositions containing a cross-linking agent, such as dimethyl ethylene urea or a urea formaldehyde condensate, and a catalyst, such as an ammonium salt of a mineral acid in addition to the polyvinyl alcohol and/or casein. Examples of suitable ammonia salt catalysts are ammonium chloride, ammonium sulfate, ammonium nitrate, ammonium phosphate, dimethylaminehydrochloride and amino acetic acid 2-amino phosphoric acid. The product containing the cross-linking agent and catalyst is then subjected to the low energy electrical discharge and, thus the product is chemically insolubilized as well as insolubilized by means of the low energy electric discharge. The amount of cross-linking agent which is added to the coating composition is from about 5% to about 40% by weight of the polyvinyl alcohol and/or casein. A preferred range of cross-linking agent is from about 20% to 40% by weight of the polyvinyl alcohol and/or casein. The weight of catalyst required is from about 10% to 15% by weight of the polyvinyl alcohol and/or casein. This process combines the advantages of the chemical treatment, e.g., ease of commercial application with the advantages of the electrical treatment, with its concomitant ability to render papers substantially water resistant.

Insolubilizing by electrical means, as contemplated by this invention can be carried out in various ways, using various types of apparatus. The accompanying drawing illustrates suitable elementary apparatus constructed by rolling a flat, rectangular piece of shimstock metal into a cylinder 10. This cylinder serves as a backing for the paper 11 which is to be treated, the paper itself being rolled into a cylinder and fitted snugly against the inside walls of the cylinder 10. One lead 12 from a D.C. power supply 13 is connected to the cylinder 10; the second lead 14 is connected through a switch 15 to a tungsten wire electrode 16 which is suspended coaxially within the cylinder. The coated paper 11 to be treated is placed in the apparatus, moistened with water and then exposed to the low energy electrical discharge created by closing switch 15 to thereby apply a suitable voltage between the cylinder 10 and the electrode 16. This apparatus may be operated at atmospheric pressure or subatmospheric pressure, in air or in some other medium. Suitable operating conditions for particular circumstances will be more fully set forth hereinafter.

While the exact explanation of the insolubilizing process is not known it is believed that if an adhesive or film forming binder, such as polyvinyl alcohol, is bombarded by ions and electrons accelerated to an appropriate velocity by a suitable electrical field the polymer molecules will be sufficiently activated to enable them to become cross-linked with one another. Such cross-linking is known to decrease water solubility of the polymer. While cross-linking of polymers of the general structure

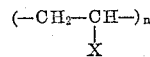

by high energy irradiation is known, such treatment is useless with materials such as polyvinyl alcohol which degrades rather than cross-links under such treatment. In the process disclosed herein cross-linking apparently dominates cleavage producing a water insoluble product retaining all of the desirable properties of the untreated polymer.

As will be obvious to those skilled in the art, the present method may be conducted in a continuous manner employing suitable apparatus for producing a low energy electrical discharge. An example of a suitable apparatus which is acceptable for carrying out the present method in a continuous manner is apparatus described in the Pierce et al. U.S. Patent No. 2,810,933 entitled "Apparatus for and Method of Treating Plastic Film."

It has been found in the practice of the present invention that moistening the coated paper with water before the electrical treatment produces better insolubilization ratings. During the electrical processes of this invention, the paper or paperboard loses moisture. The initial presence of excess moisture prevents the moisture level from falling below a minimum and hence impairing the quality of the finished product. Furthermore, the moisture probably effects a more even charge distribution, and promotes a more uniform insolubilization reaction over the entire surface of the paper. Moreover, the presence of water enhances the overall reaction by the production of peroxide intermediates which occur in organic reactions carried out in the presence of an electrical discharge.

The degree of insolubilization attained depends upon several parameters: voltage, current, exposure time, ambient pressure, and to some extent, temperature, although the temperature is, of course, dependent upon voltage and current.

The process of this invention may be carried out at almost any voltage and current value above a minimum which depends upon reaction conditions, described in greater detail below. The type of electrical discharge produced, depends upon the pressure at which the paper is treated. At pressures considerably less than one-half atmosphere, the electrical discharge is of the glow type, while at higher pressures a corona type discharge predominates. Both types of discharge are effective in this invention, however, and are consequently referred to herein inclusively as a low energy electrical discharge.

Thus, the processes of this invention may be accomplished at conditions from a minimum limit of potential which is effective to produce a field strength sufficient to cause ionization at one electrode up to a maximum potential at which arcing occurs. Such arcing produces an unacceptable scorched product and thus defeats the purposes of this invention. The important feature of the inventive processes, however, is that by the use of a low energy electrical discharge commercially acceptable water resistant papers can be produced without degradation of the coating composition. Accordingly, the preferred limits of the electrical potential of this invention are such as to produce an electrical field strength of 200 volts per centimeter to 20,000 volts per centimeter. In especially preferred operation, the field strength is 1 to 12 kilovolts per centimeter for most electrical system designs.

The invention is preferably carried out at conditions effective to produce a diffuse glow discharge. The minimum current density requirement is approximately 1 microampere per square centimeter. Below this value necessary exposure time rapidly increases. The maximum acceptable current value is the point at which the paper product begins to assume undesirable color characteristics. However, a current density value considerably less than the maximum will produce paper with excellent water resistance ratings. The preferred current density range for the invention extends from about 5–25 microamperes per square centimeter and the optimum range is from about 10–20 microamperes per square centimeter.

Although exposure time is a parameter to be considered, it is, as indicated, strongly dependent upon the electrical energy utilized in the process. Under rigorous conditions of high field strength and high current density the exposure time becomes minimal. At values less than 1000 volts per centimeter and 5 microamperes per square centimeter, the exposure time steadily increases; at values less than 200 volts per centimeter and 1 microampere per square centimeter, the exposure time is considerably higher and increases rapidly.

The following examples set forth well defined instances of one embodiment of the processes of this invention. Naturally, many modifications may be made without departing from the spirit and scope of this invention.

*Example I*

The paper coating and binder formulation utilized in the processes of this invention may be any one of the formulations prepared according to methods known in the prior art. One such typical formulation was prepared by adding a 10% solution of polyvinyl alcohol to a clay-slip. The total solids were adjusted to 50% and the ratio of polyvinyl alcohol to clay was kept at 5:100. A rectangular sheet of standard base stock paperboard having an area of almost 60 square centimeters was coated with this formulation with the aid of a No. 20 Meyer Rod. The sheet was then dried. The paper was moistened and placed in the treating apparatus. The apparatus employed consisted of a rectangular sheet of shimstock metal rolled into a cylinder about 1⅛ inch in diameter and about 4 inches high. The cylinder was placed in a glass container which could be evacuated. An 0.05 inch diameter tungsten wire having a sharp point was positioned in about the center of the cylinder extending to within about 2 inches of the bottom of the cylinder. About ⅞ on an inch of the wire was exposed, the remainder of the cylinder was encased in glass. The paper to be treated was placed adjacent the inner shimstock cylinder surface. One lead from a D.C. power source was connected to the shimstock cylinder while the second lead was connected to the tungsten wire suspended within the cylinder. The ambient pressure was reduced to approximately one-half atmosphere. The paper was treated in accordance with the invention for 30 minutes; the potential difference between the wire electrode and the shimstock was about 7–8 kilovolts and the current flowing between the electrodes was about 1.5 milliamperes. The paper was then removed from the apparatus, tested and found to have a satisfactory wet-rub resistance rating of 9.

A control specimen was prepared according to the above procedures except that it was not exposed to the electric discharge. The control had a wet-rub rating of 1. Thus, it is apparent that the specimen which was exposed to the electric discharge according to the process of the present invention possessed a greatly improved wet-rub resistance compared to the wet-rub resistance of the control.

The insolubilization ratings of papers treated with binder compositions and exposed to the low energy electrical discharge of this invention, and all control specimens, were determined by a standard wet-rub test, widely used in the paper coating art. This test measures the degree of wet-rub resistance imparted to a coating by an insolubilization treatment. It consists of placing a droplet of water on the coated paper, allowing it to remain there for one minute and then drawing it down onto a black cardboard by finger. The amount of clay deposited on the black cardboard serves as an indication of the effectiveness of the procedure for rendering the coated paper water-resistant.

In the experiments, a standard set of eight tests was replaced by a set of ten such tests which more accurately reflect the ranges of degrees of "wet-rub" resistance from very poor (Standard No. 1) to very good (Standard No. 10).

*Example II*

A binder formulation was prepared according to the procedure of Example I, substituting a 20% solution of casein for the polyvinyl alcohol in the clay-slip. The paper product resulting from coating with this formulation was exposed to a low energy electrical discharge in the apparatus of Example I of 5 kilovolts and 2 milliamperes at a pressure of one-half atmosphere. The paper had a wet-rub resistance of 9.

We claim:

1. A process for rendering water resistant, paper coated with a coating agent selected from the group consisting of polyvinyl alcohol and casein, comprising exposing the coated paper to a low energy electrical discharge.

2. A process for rendering water resistant, paper coated with a coating agent selected from the group consisting of polyvinyl alcohol and casein, comprising moistening the coated papers with water, and exposing said paper to a low energy electrical discharge.

3. A process for rendering water resistant, paper coated with a coating agent selected from the group consisting of polyvinyl alcohol and casein, comprising moistening said coated paper with water, and exposing said paper to a low energy electrical discharge having a field strength of about 200–20,000 volts per centimeter and having a current density of above about 1 microampere per square centimeter at a pressure of from approximately one-half to one atmosphere.

4. A process for water insolubilizing a film containing polyvinyl alcohol, comprising exposing said film to a low energy electrical discharge.

5. A process for water insolubilizing a film containing polyvinyl alcohol, comprising moistening said film with water, and then exposing said film to a low energy electrical discharge having a field strength of 200–20,000 volts per centimeter and having a current density of above 1 microampere per square centimeter, at an ambient pressure of from approximately one-half to one atmosphere.

6. A process for rendering water resistant, paper treated with a coating composition comprising a coating agent selected from the group consisting of polyvinyl alcohol and casein, a cross-linking agent, and a catalyst, comprising moistening said coated paper with water and exposing said paper to a low energy electrical discharge.

References Cited in the file of this patent

UNITED STATES PATENTS

| | | |
|---|---|---|
| 1,542,539 | Wright | June 16, 1925 |
| 2,859,480 | Berthold et al. | Nov. 11, 1958 |
| 2,897,092 | Miller | July 28, 1959 |